United States Patent Office 3,332,735
Patented July 25, 1967

3,332,735
SULFONYL CHLORIDE MODIFICATION OF WOOL IN PRESENCE OF BUTYROLACTONE AND METHYLPYRROLIDONE
Nathan H. Koenig, Berkeley, Calif., assignor to the United States of America as represented by the Secretary of Agriculture
No Drawing. Filed Mar. 12, 1965, Ser. No. 439,486
4 Claims. (Cl. 8—128)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the chemical modification of wool by reacting it with an organic sulfonyl chloride. Further objects and advantages of the invention will be apparent from the following description wherein parts and percentages are by weight unless otherwise specified.

In accordance with the present invention, wool is reacted with an organic sulfonyl chloride in the present of a mixture of N-methyl-2-pyrrolidone (hereinafter referred to as methylpyrrolidone) and $\gamma$-butyrolactone. The said mixture catalyzes the actual chemical combination of the wool and the sulfonyl chloride reactant. As a consequence, one is enabled to readily prepare wools containing substantial proportions of combined sulfonyl chloride with correspondingly improved properties. In contrast, sulfonyl chlorides alone or in the presence of common organic solvents only react slightly with wool so that the degree of modification is low. Moreover, it has been found that when a sulfonyl chloride is reacted with wool in the presence of a mixture of methylpyrrolidone and $\gamma$-butyrolactone, unexpected superior results are attained as compared to the reaction in the presence of either methylpyrrolidone alone or $\gamma$-butyrolactone alone. A primary advantage of the invention is that it yields an unexpectedly high degree of modification.

The unusual and effective action of mixtures of methylpyrrolidone and $\gamma$-butyrolactone as catalysts for the reaction in question is demonstrated by the following experimental data:

*Example I*

A series of runs were carried out wherein dry wool flannel was reacted with benzenesulfonyl chloride in the presence of a mixture of methylpyrrolidone and $\gamma$-butyrolactone or either one of these liquids alone. In these runs, the weight of dry wool was 1.2 grams, the volume of benzenesulfonyl chloride was 2 ml., the volume of other liquid or mixture of liquids was 6 ml., the reaction time was 60 minutes and the temperature of reaction was 105° C. At the conclusion of the reaction period, unreacted materials were removed by first rubbing the wool under warm acetone and then extracting the fabric with ethanol overnight in a Soxhlet apparatus. The wool was then dried and weighed to determine the percent increase in weight of the wool. The liquid or mixture and the percent weight increase is tabulated below:

| Run | Liquid or mixture | Increase in weight of wool, percent |
|---|---|---|
| a | Methylpyrrolidone and $\gamma$-butyrolactone* | 15 |
| b | Methylpyrrolidone | 12 |
| c | $\gamma$-Butyrolactone | 9 |

* 2 ml. methylpyrrolidone, 4 ml. $\gamma$-butyrolactone.

The fact that mixtures of methylpyrrolidone and $\gamma$-butyrolactone act as catalysts for wool modification with sulfonyl chlorides, and not merely as a solvent system is exemplified by the following comparative experiment:

*Example II*

(a) Dry wool (1.2 g.), 2,5-dimethylbenzenesulfonyl chloride (2 ml.), methylpyrrolidone (1 ml.), and $\gamma$-butyrolactone (3 ml.) were heated for 90 minutes at 105° C. The wool was extracted as in Example I and dried. The increase in weight of the wool, due to reaction with the sulfonyl chloride, was 18%. A series of experiments were then carried under the same conditions but substituting for the methylpyrrolidone and $\gamma$-butyrolactone 4 ml. of one of the following solvents: (b) butyl acetate, (c) chlorobenzene, and (d) xylene. In these runs, the increase in weight of the wool was only 3%.

It is apparent from the above data that mixtures of methylpyrrolidone and $\gamma$-butyrolactone unexpectedly achieve a substantially higher degree of modification than either liquid alone or any of the other liquids listed. The mixture of methylpyrrolidone and $\gamma$-butyrolactone acts not only as a catalyst but also as a swelling medium. The sulfonyl chloride is thereby enabled to penetrate into the molecular structure and react with some of the functional groups. Thus the reaction is one of internal chemical modification and is not restricted to fiber surfaces. Since the process of the invention yields wools of an enhanced degree of modification, it has the practical advantage of yielding products which exhibit greater resistance to deleterious influences or agents such as laundering shrinkage and household bleaches containing sodium hypochlorite. Another advantage of the process is that the improvement is essentially permanent; the treated materials do not lose their new properties after long use or cleaning but retain these properties for the life of the material.

Carrying out the process of the invention essentially involves contacting wool with an organic sulfonyl chloride in the presence of a mixture of methylpyrrolidone and $\gamma$-butyrolactone. The reaction conditions such as proportion of reagant, specific sulfonyl chloride used, time, temperature, etc. are not critical but may be varied to suit individual circumstances without changing the basic nature of the invention. The temperature of reaction may be about from 50° to 130° C. The reaction rate is increased with increasing temperature and a preferred temperature range to expedite the reaction without damage to the wool is 100–120° C. Generally, the mixture of methylpyrrolidone and $\gamma$-butyrolactone is used in a proportion of about 2 to 5 parts of the mixture per part of sulfonyl chloride. The relative proportions in the mixture may range, for example, from about 0.1 to about 1 volume of methylpyrrolidone per volume of $\gamma$-butyrolactone. It is preferred to carry out the reaction under anhydrous conditions thereby to ensure reaction between the wool and the sulfonyl chloride. The degree of modification of the wool is related to the proportion of sulfonyl chloride taken up by the fiber, that is, the higher the uptake of sulfonyl chloride the greater will be the modification of the wool. In general the uptake of sulfonyl chloride may be varied from 1 to 20% by weight. In conducting the reaction, the sulfonyl chloride is generally employed in excess over the amount desired to be taken up by the fibers. The time of reaction will vary depending on such factors as the proportion of methylpyrrolidone and $\gamma$-butyrolactone, temperature of reaction, reactivity of the sulfonyl chloride selected, and the degree of modification desired. In general, the reaction may take anywhere from several minutes to several hours.

After reaction of the wool with the sulfonyl chloride, the chemically modified wool is preferably treated to remove excess sulfonyl chloride, reaction-by-products, methylpyrrolidone, γ-butyrolactone, and diluent, if such is used. Thus, the wool may be treated as by wringing, passage through squeeze-rolls, centrifugation, or the like to remove the excess materials. In place of such mechanical action, or following it, the product may be extracted with an inert volatile solvent such as trichloroethylene, benzene, acetone, carbon tetrachloride, alcohol, etc. Successive extractions with different solvents may be used to ensure complete removal of all unreacted materials. The treated wool is then dried in the usual way.

Wool modified in accordance with the invention exhibits advantageous properties over normal wool. For example, the modified wool is more resistant to oxidizing conditions. Such conditions may be encountered in textile mills during bleaching, shrinkproofing, or other finishing processes. Oxidizing environments also occur in use by the action of light and air, and in laundering by bleaching chemicals. The increased resistance to oxidizing conditions has been shown by exposing normal and modified wool samples to solutions of sodium hypochlorite, which is used in commercial bleaches.

The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the modified wool indicate beyond question that actual chemical combination between the sulfonyl chloride and wool has taken place, it is not known for certain how the sulfonyl chloride is united with the wool. It is believed, however, that the sulfonyl chloride reacts with sites in the wool molecule where there are reactive hydrogen atoms—these include such groups as amino, hydroxyl, and thiol. It may be, however, that other reactions occur and I do not intend to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, knitted or woven goods, belts, etc. The wool textiles may be white or dyed goods and may be of all-wool composition or blends of wool with other textile fibers such as cotton, regenerated cellulose, viscose, animal hair, etc.

The catalytic effect of mixtures of methylpyrrolidone and γ-butyrolactone is not restricted to any particular sulfonyl chloride or class of sulfonyl chlorides. Consequently, the invention may be applied in the reaction of wool with all types of organic sulphonyl chlorides. Particularly preferred are the aliphatic, aromatic, or aromatic-aliphatic compounds containing one or more sulphonyl chloride groups. These compounds may be hydrocarbon sulphonyl chlorides or may contain substituents on the hydrocarbon residue, such as halogen (chlorine, bromine, iodine, or fluorine), ether groups, ester groups, nitro groups, etc. Examples of compounds coming into the purview of the invention are listed below by way of illustration and not limitation: methanesulfonyl chloride, ethanesulfonyl chloride, butanesulfonyl chloride, hexanesulfonyl chloride, octanesulfonyl chloride, decanesulfonyl chloride, dodecanesulfonyl chloride, hexadecanesulfonyl chloride, octadecanesulfonyl chloride, cyclohexanesulfonyl chloride, methylcyclohexanesulfonyl chloride, 2-chloroethanesulfonyl chloride, 12-chlorododecanesulfonyl chloride, 4-chlorocyclohexanesulfonyl chloride, 2-ethoxyethanesulfonyl chloride, ethylene disulfonyl chloride, butylene disulfonyl chloride, hexamethylene disulfonyl chloride, bis-(2-chlorosulphonylethyl)ether, benzenesulfonyl chloride, o-toluenesulfonyl chloride, m-toluenesulfonyl chloride, p-toluenesulfonyl chloride, xylenesulfonyl chlorides, naphthalenesulfonyl chlorides, dodecylbenzenesulfonyl chloride, p-chlorobenzenesulfonyl chloride, p-nitrobenzenesulphonyl chloride, p-methoxybenzenesulfonyl chloride, m-phenylene disulfonyl chloride, tolylene-2,4-disulfonyl chloride, diphenylmethane-4,4'-disulfonyl chloride, and α-toluenesulfonyl chloride.

The invention is demonstrated by Examples I and II above and by the following examples:

Example III

Tests were carried out to determine the improvement in shrinkage characteristics of some of the modified wools prepared in Example I. The shrinkage tests were carried out as follows: Measured wool samples were milled at 1700 r.p.m. for 6 minutes at 40–42° C. in an "Accelerotor" with 0.9% sodium oleate solution, using a liquor-to-wool ratio of 50 to 1. After this washing operation, the samples were remeasured to determine the area shrinkage. The improvement in shrinkage properties of wool modified in accordance with the invention is demonstrated by the following data:

| Run (Example I) | Medium Used in Modifying Wool | Area Shrinkage, Percent |
|---|---|---|
| a | Methylpyrrolidone and γ-butyrolactone | 0 |
| Blank | (Untreated wool) | 49 |

Example IV

Tests were carried out to determine the resistance of some of the products, prepared in Example II, to attack by sodium hypochlorite solutions.

The hypochlorite resistance test was performed as follows: A 2-cm. length of yarn was removed from the fabric and placed in a 50-ml. beaker containing 20 ml. of 3% aqueous sodium hypochlorite. The liquid was stirred by the rotation of a magnetically-activated bar until the yarn had dissolved, and the elapsed time was noted.

The results tabulated below show the increased resistance to sodium hypochlorite of wool modified in accordance with the invention.

| Run (Example II) | Medium Used in Modifying Wool | Time to Dissolve Yarn in Hypochlorite, min. |
|---|---|---|
| a | Methylpyrrolidone and γ-butyrolactone | 26 |
| b | Butyl acetate | 4 |
| c | Chlorobenzene | 4 |
| d | Xylene | 4 |
| Blank | (Untreated wool) | 4 |

Example V

A 1.2-gram sample of dry wool flannel was treated with 2.0 ml. of benzenesulfonyl chloride, 1.5 ml. of methylpyrrolidone, and 4.0 ml. of γ-butyrolactone for 90 minutes at 105° C. The wool was extracted as in Example I and dried. The uptake of sulfonyl chloride by the wool was 19%. A sample of the product was then tested for resistance to sodium hypochlorite according to the procedure of Example IV. It required 40 minutes to dissolve the yarn.

Example VI

A 1.2-gram sample of dry wool flannel was treated with 1.0 gram of 1,3-benzenedisulfonyl chloride, 1.0 ml. of methylpyrrolidone, and 4.0 ml. of γ-butyrolactone for 90 minutes at 105° C. The wool was extracted as in Example I and dried. The uptake of sulfonyl chloride was 20%.

Having thus described the invention, what is claimed is:
1. A process for chemically modifying wool which comprises reacting wool under anhydrous conditions, in the presence of a mixture of methylpyrrolidone and

γ-butyrolactone, with an organic sulfonyl chloride selected from the group consisting of aromatic, aliphatic, and aromatic-aliphatic sulfonyl chlorides.

2. The process of claim 1 wherein the organic sulfonyl chloride is benzenesulfonyl chloride.

3. The process of claim 1 wherein the organic sulfonyl chloride is 2,5-dimethylbenzene sulfonyl chloride.

4. The process of claim 1 wherein the organic sulfonyl chloride is benzene-1,3-disulfonyl chloride.

References Cited
UNITED STATES PATENTS

| | | | |
|---|---|---|---|
| 2,993,748 | 7/1961 | Koenig | 8—128 |
| 3,110,542 | 11/1963 | Koenig | 8—128 |
| 3,110,543 | 11/1963 | Koenig et al. | 8—128 |

NORMAN G. TORCHIN, *Primary Examiner.*

J. C. CANNON, *Assistant Examiner.*